US010326905B2

(12) United States Patent
Goldberg et al.

(10) Patent No.: US 10,326,905 B2
(45) Date of Patent: Jun. 18, 2019

(54) SENSORY AND COGNITIVE MILIEU IN PHOTOGRAPHS AND VIDEOS

(71) Applicant: International Business Machines Corporation, Armonk, NY (US)

(72) Inventors: Itzhack Goldberg, Hadera (IL); James R. Kozloski, New Fairfield, CT (US); Clifford A. Pickover, Yorktown Heights, NY (US); Neil Sondhi, Budapest (HU)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/859,533

(22) Filed: Dec. 31, 2017

(65) Prior Publication Data

US 2018/0124271 A1  May 3, 2018

Related U.S. Application Data

(63) Continuation of application No. 14/985,712, filed on Dec. 31, 2015, now Pat. No. 9,912,831.

(51) Int. Cl.
*H04N 5/225*  (2006.01)
*H04N 1/32*  (2006.01)
*H04N 1/00*  (2006.01)
*H04N 1/21*  (2006.01)

(52) U.S. Cl.
CPC ..... *H04N 1/32128* (2013.01); *H04N 1/00244* (2013.01); *H04N 1/212* (2013.01); *H04N 2201/3252* (2013.01); *H04N 2201/3264* (2013.01)

(58) Field of Classification Search
None
See application file for complete search history.

(56) References Cited

U.S. PATENT DOCUMENTS

| 9,912,831 | B2 | 3/2018 | Goldberg | |
| 2006/0171704 | A1* | 8/2006 | Bingle | B60R 11/04 396/419 |
| 2011/0078172 | A1 | 3/2011 | LaJoie | |
| 2012/0047247 | A1* | 2/2012 | Piernot | G06F 17/30946 709/224 |
| 2014/0013193 | A1* | 1/2014 | Selinger | G06F 17/212 715/203 |
| 2014/0078331 | A1 | 3/2014 | McMahon | |

OTHER PUBLICATIONS

Benj Azose, Adding Appropriate Sound to Photographs Based on their Content, IPCOM000236537D, May 1, 2014, pp. 1-3, 80K, The IP.com Prior Art Database.
List of IBM Patents or Patent Applications Treated As Related p. 1-2 May 29, 2018.

* cited by examiner

*Primary Examiner* — Stephen P Coleman
(74) *Attorney, Agent, or Firm* — Rahan Uddin; Otterstedt, Ellenbogen & Kammer, LLP

(57) ABSTRACT

A method includes receiving a package comprising an image and metadata of the image including ambient condition data, storing the package in a memory, receiving a request for the image, outputting the image in response to the request, determining a context of the request, determining, using the context of the request, a substitute for the ambient condition data, and outputting the substitute for the ambient condition data with the image.

5 Claims, 6 Drawing Sheets

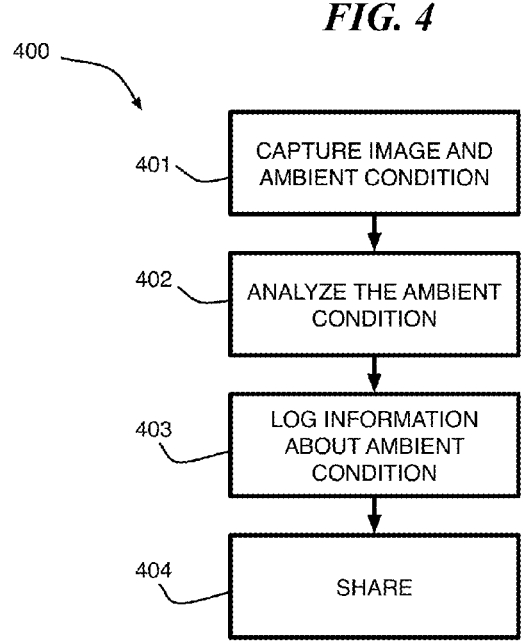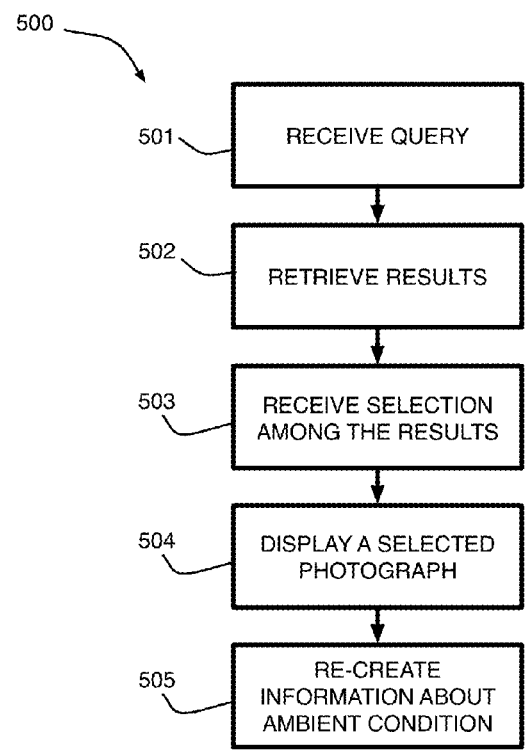

SENSORY AND COGNITIVE MILIEU IN PHOTOGRAPHS AND VIDEOS

CROSS-REFERENCE TO RELATED APPLICATION

This application is a continuation of U.S. patent application Ser. No. 14/985,712, filed Dec. 31, 2015, the complete disclosure of which is expressly incorporated herein by reference in its entirety for all purposes.

BACKGROUND

The present disclosure relates to the usage of ambient information associated with a photograph, and more particularly to re-creating sensory and cognitive milieu associated with an environment in which a photograph is captured.

The identification of data related to the creative arts, be it music, photographs, etc., presents unique problems in the field of computer systems.

BRIEF SUMMARY

According to an exemplary embodiment of the present invention, a method includes receiving a package comprising an image and metadata of the image including ambient condition data, storing the package in a memory, receiving a request for the image, outputting the image in response to the request, determining a context of the request, determining, using the context of the request, a substitute for the ambient condition data, and outputting the substitute for the ambient condition data with the image.

According to an exemplary embodiment of the present invention, a system includes an image capture device configured to capture an image, an ambient condition capture device configured to capture ambient condition data substantially contemporaneous with the capture of the image, a processor receiving the ambient condition data from the ambient condition capture device and outputting metadata including data about the ambient condition data, and a memory storing a package comprising an image captured by the image capture device and the metadata, wherein the image is associated with the metadata.

As used herein, "facilitating" an action includes performing the action, making the action easier, helping to carry the action out, or causing the action to be performed. Thus, by way of example and not limitation, instructions executing on one processor might facilitate an action carried out by instructions executing on a remote processor, by sending appropriate data or commands to cause or aid the action to be performed. For the avoidance of doubt, where an actor facilitates an action by other than performing the action, the action is nevertheless performed by some entity or combination of entities.

One or more embodiments of the invention or elements thereof can be implemented in the form of a computer program product including a computer readable storage medium with computer usable program code for performing the method steps indicated. Furthermore, one or more embodiments of the invention or elements thereof can be implemented in the form of a system (or apparatus) including a memory, and at least one processor that is coupled to the memory and operative to perform exemplary method steps. Yet further, in another aspect, one or more embodiments of the invention or elements thereof can be implemented in the form of means for carrying out one or more of the method steps described herein; the means can include (i) hardware module(s), (ii) software module(s) stored in a computer readable storage medium (or multiple such media) and implemented on a hardware processor, or (iii) a combination of (i) and (ii); any of (i)-(iii) implement the specific techniques set forth herein.

Techniques of the present invention can provide substantial beneficial technical effects. For example, one or more embodiments may provide one or more of the following advantages:

creating a reminder of a sensory and cognitive milieu at from the time a photograph was taken; and facilitating a "keepsake moment" while viewing a photograph using re-created information about the sensory and cognitive milieu at from the time a photograph was taken.

These and other features and advantages of the present invention will become apparent from the following detailed description of illustrative embodiments thereof, which is to be read in connection with the accompanying drawings.

BRIEF DESCRIPTION OF THE SEVERAL VIEWS OF THE DRAWINGS

Preferred embodiments of the present invention will be described below in more detail, with reference to the accompanying drawings:

FIG. 4 is a flow diagram of a method for capturing information about an ambient condition according to an embodiment of the present invention;

FIG. 5 is a flow diagram of a method for displaying a photograph and re-creating information about an ambient condition according to an embodiment of the present invention;

DETAILED DESCRIPTION

Figure 1:
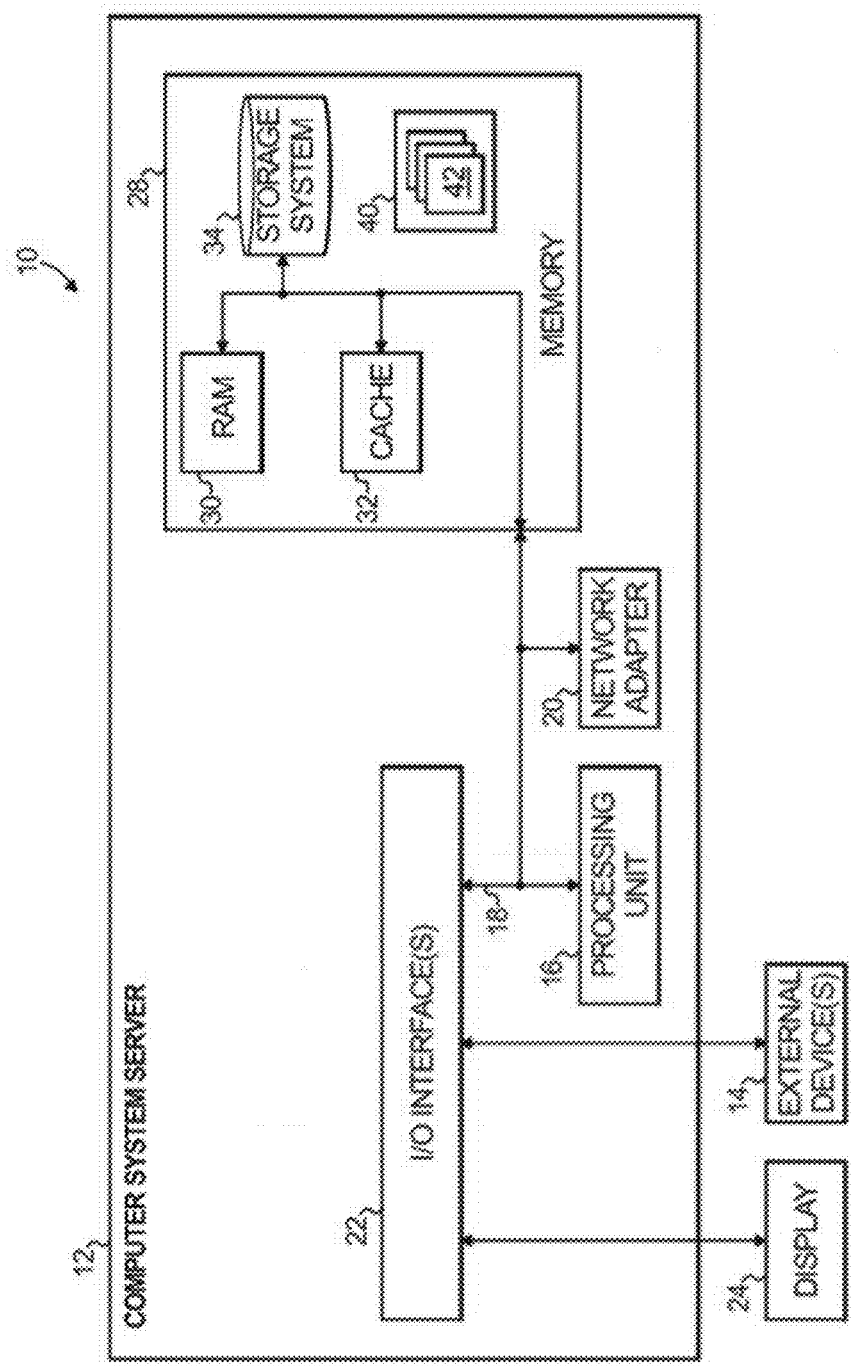
FIG. 1 depicts a cloud computing node according to an embodiment of the present invention.

According to an exemplary embodiment of the present invention, a computer system is configured to provide reinforcing cues in connection with the viewing of a photograph. More particularly, the computer system operates to re-create an ambient milieu (e.g., sensory and cognitive milieu) associated with an environment in which a photograph is captured.

According to an exemplary embodiment of the present invention, ambient conditions (e.g., sounds, motion, light, etc.) are recorded in connection with the capture of a photograph, the ambient conditions are analyzed (e.g., to identify music tracks, tremors, color temperature of ambient light), the analyzed conditions are associated with photograph in a database structure, such that the analyzed conditions and photograph are stored for later retrieval. According to an embodiment of the present invention, upon receiving a query resulting in the selection of the photograph, the analyzed conditions are re-created (e.g., using a speaker, lighting, etc.) while the photograph is displayed.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, and external disk drive arrays, RAID systems, tape drives, and data archival storage systems, etc.

Figure 2:
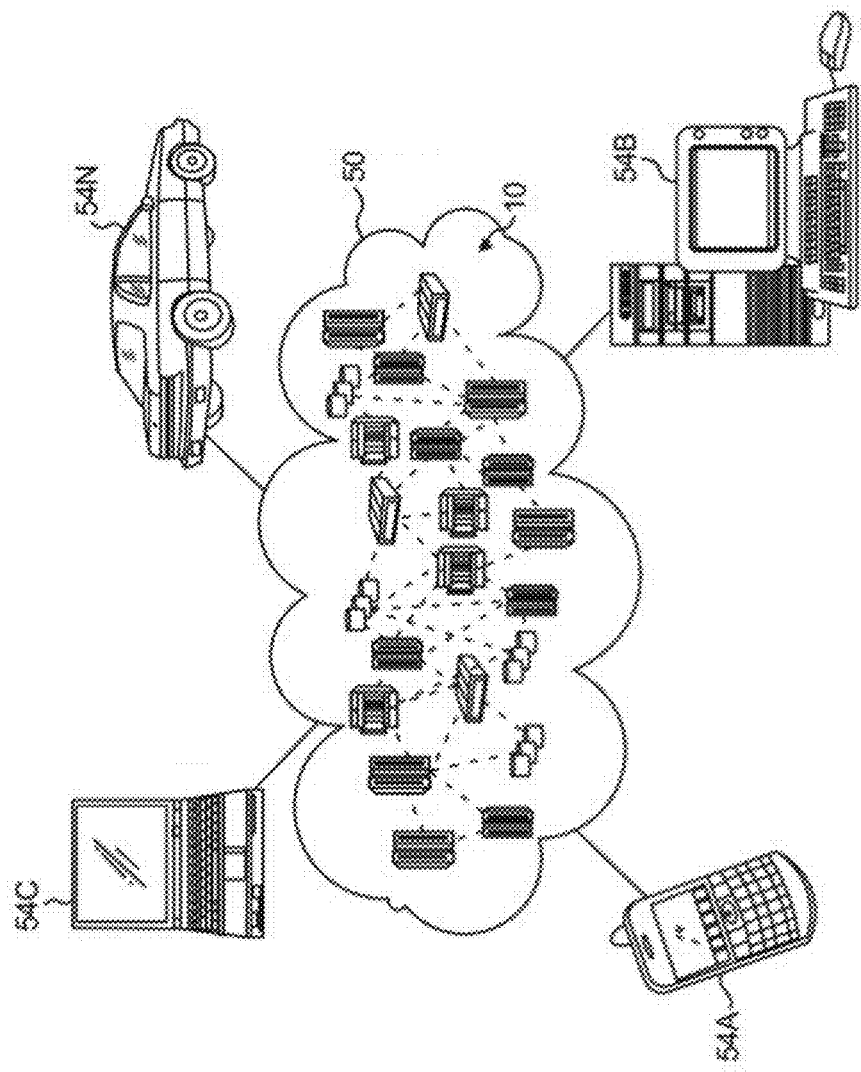
FIG. 2 depicts a cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
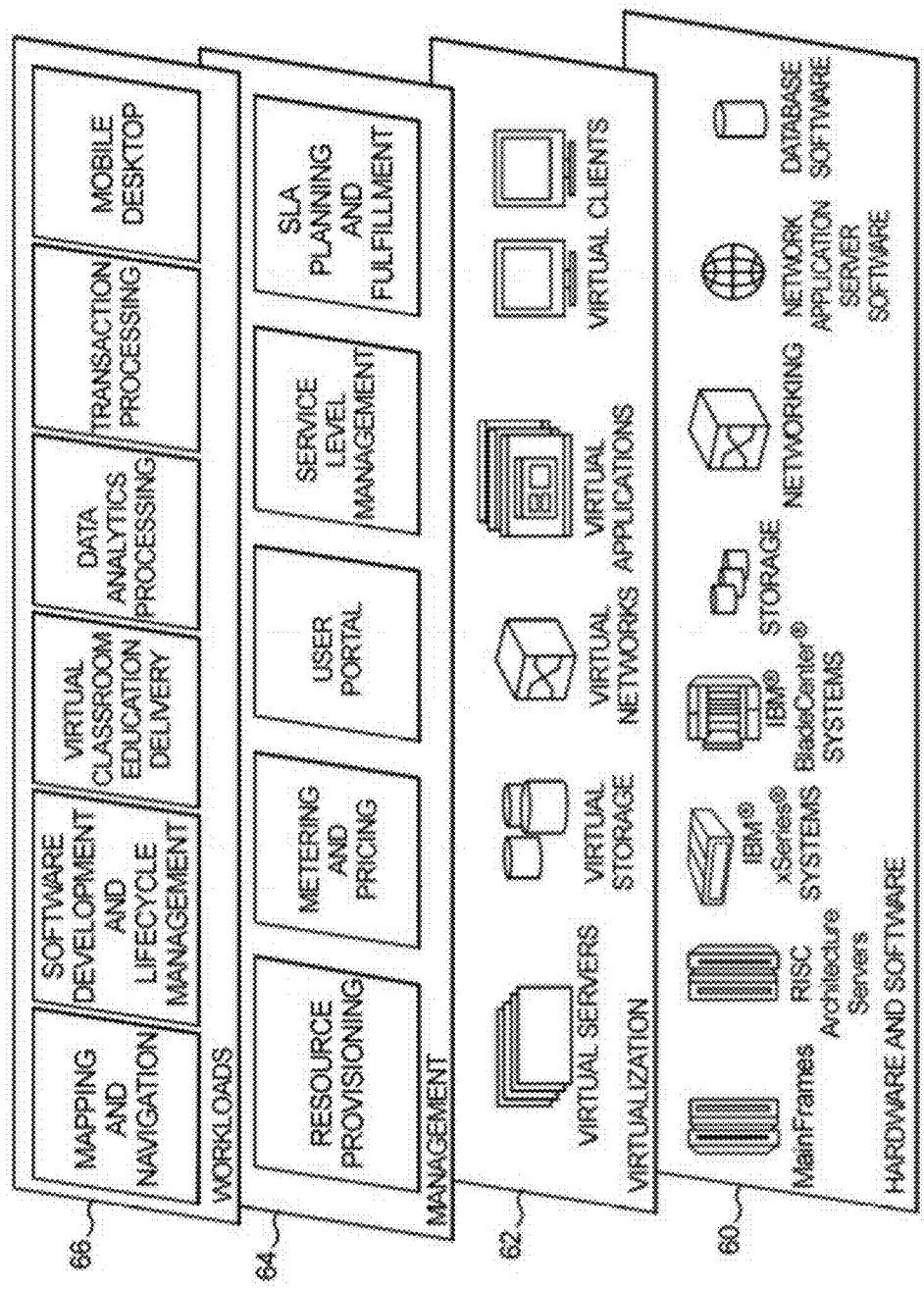
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM Web Sphere® application server software; and database software, in one example IBM DB2® database software. (IBM, zSeries®, pSeries, xSeries, BladeCenter, Web Sphere, and DB2 are trademarks of International Business Machines Corporation registered in many jurisdictions worldwide).

Virtualization layer 62 provides an abstraction layer from which the following examples of virtual entities may be provided: virtual servers; virtual storage; virtual networks, including virtual private networks; virtual applications and operating systems; and virtual clients.

In one example, management layer 64 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provides pre-arrangement for, and procurement of, cloud computing resources for which a future requirement is anticipated in accordance with an SLA.

Workloads layer 66 provides examples of functionality for which the cloud computing environment may be utilized. Examples of workloads and functions which may be provided from this layer include: mapping and navigation; software development and lifecycle management; virtual classroom education delivery; data analytics processing; transaction processing; and mobile desktop.

According to an exemplary embodiment of the present invention, ambient information associated with a photograph is captured, analyzed and stored. The stored ambient information is retrieved from memory to re-create cognitively and/or demographically impactful sensory conditions when displaying the photograph. The sensory conditions create a pertinent reminder of the sensory and cognitive milieu that existed at the time the photograph was captured. In one or more embodiments, the ambient information is ambient music, but other conditions can be captured.

According to an embodiment of the present invention, the stored ambient information is available for retrieval within the context of a social network. In this case the stored ambient information can be used to convey sensory information to third parties (i.e., those not present when the photograph was captured).

Referring to FIG. 4, according to an embodiment of the present invention, a method 400 facilitating the re-creation of sensory and cognitive milieu associated with an environment in which a photograph is captured includes recording, by an image capture device, at least one ambient condition together with the capture of a photograph 401. The ambient condition is stored as metadata associated with the respective photographic data.

It should be understood that the term "metadata" used in this document is to be construed broadly as data associated with other data, unless explicitly described otherwise in a particular case. For example, a photograph is stored in a package including metadata, such that the metadata is associated with the photograph. Exif (Exchangeable Image File Format) is an example of a package that stores technical metadata about capture and image characteristics, along with the image data and a thumbnail. The metadata can take the form of additional data, which describes an attribute or content of the photograph. For example, the metadata can include descriptive, technical and administrative information about the photograph. In at least one embodiment, the descriptive information can include various information about the content of a photograph. This can include captions, headlines, titles, keywords, location of capture, etc. In one or more embodiments, the ambient condition is a sound environment captured as an audio sample digital waveform by a microphone of the image capture device. In another embodiment, the ambient condition is a color temperature of the ambient environment surrounding the portion of the environment captured as photographic data. In yet another embodiment, the ambient condition is movement of the image capture device, captured from an accelerometer of the image capture device. According to still another embodiment of the present invention, the ambient condition is captured from a heart rate or respiration monitor of a wearable device, e.g., to determine a level of activity or excitement at the time the photograph was captured.

At block 402 the ambient conditions are analyzed. The analysis of the ambient condition can be performed by the image capture device, a computer system onto which the captured photograph and metadata including data about the ambient condition is loaded, a cloud computer system including a communications interface to the image capture device and/or the computer system. According to an embodiment of the present invention, the audio sample of the ambient condition is an audio input to be analyzed. In one or more embodiments of the present invention, the analysis of the audio sample identifies music tracks in the audio input. According to an embodiment of the present invention, other sounds in the audio sample can be identified, such as birds, water splashing, etc.

In one or more embodiments of the present invention, the sample audio of the ambient sound is analyzed to determine a most similar sound in a library of different stored sounds, such that the ambient condition associated with the photograph is stored as a pointer to a sound in the library determined to be a most similar sound. Ambient noise levels in the audio sample can be categorized and logged, such that a recipient's device can generate similar properties of ambient noise while displaying the photograph.

In one or more embodiments of the present invention, the analysis includes matching an acoustic fingerprint of the sample to a database of acoustic fingerprints for different tracks. If the system finds a match, it logs the information in the database structure together with the respective photograph 403. In one or more embodiments, the analysis identifies ambient sounds corresponding to animals, machinery, a natural environment and the like.

According to an embodiment of the present invention, the photograph and information about the ambient condition can be shared 404, e.g., through electronic communication, social media, etc.

According to an embodiment of the present invention, once the photograph and information about the ambient condition are stored, they become available for access by one or more parties. For example and with reference to FIG. 5, a method 500 for serving photo and ambient data, the computer system can receive a query for a photograph 501 and retrieve one or more photographs based on the query 502. According to an embodiment of the present invention, the computer system receives a user a selection of a retrieved photograph 503. Upon receiving the selection, the selected photograph is displayed 504 and the information about the ambient condition is re-created (e.g., using a speaker, lighting, etc.) 505.

According to an exemplary embodiment of the present invention, re-creation of the information about the ambient condition 505 can include selecting a song independent of the audio sample. The independent song can be selected for a variety of reasons, e.g., to achieve improved emotional effect, to achieve improved emotional effect when the joint visual-audio is shared with others, to be more palatable to a new generation of viewers, to be more palatable to viewers from a different culture or social network, to be more compelling when played on devices with small speakers, to disambiguate the emotional content of the displayed image, etc.

According to an embodiment of the present invention, the re-creation at 505 includes searching a music library for song identification (e.g., tag) associated with a retrieved photograph. The search can be of a local database (e.g., the music library of a user performing the search). In at least one embodiment of the present invention, if the song identification is not found in a local library, the computer system suggests that the user purchase the song for use in viewing the photograph.

In at least one embodiment of the present invention, the song associated with the song identification is cued up to a certain point within the song track (e.g., to the point playing when the photograph was captured).

According to a further embodiment of the present invention, the analysis at 402 includes an automated recommendation of music to accompany photographs. For example, based on the GPS coordinates of encoded in a photograph indicating that the photograph was taken within the Caribbean island chain, the computer system logs information about the ambient condition including a recommendation of music selection from Caribbean artists.

According to an exemplary implementation of an embodiment of the present invention, consider a case of a photographer attending a wedding, and at a certain time during the event a band plays "Happy Together," a song released in the year 1967 by The Turtles, on an album of the same name. Contemporaneously with the taking of a photograph, a device records an audio sample. A third party audio identification application, such as SHAZAM, identifies the song as "Happy Together" and offers 3 possible songs (or versions) to associate with the photograph. The application also suggests another song, which is similar to the identified song, and which can be selected to achieve one or more suggested environments. For example, the similar song can be selected to create an impression within a social network, to induce a particular feeling based on surveys, polls, and/or a cognitive profile of a viewer, or to be more palatable to a viewer of a different generation (e.g., using user preferences provided to by a user when requesting to view the image) and/or at a foreign location (e.g., determined based on IP address of a device requesting the image for viewing, GPS data from a mobile device requesting the image for viewing, etc.). In at least one embodiment, the suggested similar song has a different tempo or other spectral characteristics more likely to be pleasing when played on a smartphone with small speakers. In at least one embodiment, the user selects the alternate song, which is used for some viewers, but for other viewers.

According to an embodiment of the present invention, the re-created information about the ambient condition facilitates a "keepsake moment" quality by playing pristine studio recorded quality while viewing the photograph rather than the raw audio sample. Similarly, for other sound effects, noise, etc., it is the archetypal form of the ambient sound recorded while the photograph was made that is targeted by analysis and selection of playback audio.

Exemplary embodiments of the present invention can be extended to other sensory modalities. Note that this approach may extend to related areas, by inducing a sensory experience beyond vision (e.g., smell, tactile). For example, digital scent technology (or olfactory technology) is the engineering discipline dealing with olfactory representation. It is a technology to sense, transmit and receive scent-enabled digital media (such as web pages, video games, movies and music). This sensing part of this technology works by using olfactometers and electronic noses. Thus, in one embodiment, a device capturing a photograph is also equipped with or in communication with an olfactometer, electronic noise, chemosensor, etc.

Exemplary embodiments of the present invention can be extended to other types of images, for example, being used in the production of films.

According to an embodiment of the present invention, the captured photograph is associated with a cognitive state of the photographer. Consider an example where one uses a photograph or self-portrait that is captured while on vacation. Later, the person wants to re-create the experience, the metadata added to the photograph gives a cognitive state of the individuals in the photo/video in addition to the climate and setup where the shot was taken. As taught herein, ambient music or scents can also be identified. According to one or more embodiments, a capture device records, as input, an estimated cognitive state of an individual when a photo (or video or message) is created. The capture device or other output devices re-creates the ambient condition using information about different songs and corresponding cognitive states to recreate the cognitive state at the time the photograph was captured.

It should be understood that the phrase "cognitive state" and the like used in this document refer to a quality or state of a subject or photographer that is indicative and/or predictive of an individual's behavioral context.

Referring again to FIG. 5, the computer system can receive a query for a photograph 501 and retrieve one or more photographs based on the query 502. In at least one exemplary embodiment, the system supports searches of a database based on metadata. For example, the system can return imagery associated with a query giving a specific cognitive state. More particularly, the system can determine a probable cognitive state associated with an image using image analysis and mined data from historical records of images and associated cognitive states. In at least one example, the system receives a digital photograph that creates a cognitive response, and a wearable monitor indicates an cognitive response of the user at the time the photograph is taken. The cognitive response is used as a metadata key associated with the photograph. Given the input digital photograph, the system searches for other images that have a similar metadata key indicating a similar cognitive response. In at least one embodiment of the present invention, the functions of the system are implemented in an IOT (Internet of Things) network of devices, including for example, a camera that captured the digital photograph and recorded the metadata, the system, implemented as a cloud server, the responses to queries, and the wearable monitor that captures the cognitive state recorded by the camera.

In at least one embodiment, a system measures a cognitive state before and after a photograph is captured and notes both states as metadata in a service storing the photograph. Depending on a viewer of a shared photo, a similar change in cognitive state is targeted by presenting ambient cues and stimuli to the viewer. The service can then use the metadata to determining changes in cognitive state for different background music to determine whether particular music (e.g., different genres, different volume, different themes found in the music etc.) promotes or impairs cognitive performance.

By way of recapitulation, according to an exemplary embodiment of the present invention, a method a method includes receiving a package comprising an image and metadata of the image including ambient condition data, storing the package in a memory, receiving a request for the image, outputting the image in response to the request, determining a context of the request, determining, using the context of the request, a substitute for the ambient condition data, and outputting the substitute for the ambient condition data with the image.

The methodologies of embodiments of the disclosure may be particularly well-suited for use in an electronic device or alternative system. Accordingly, embodiments of the present invention may take the form of an entirely hardware embodiment or an embodiment combining software and hardware aspects that may all generally be referred to herein as a "processor," "circuit," "module" or "system."

Figure 6:
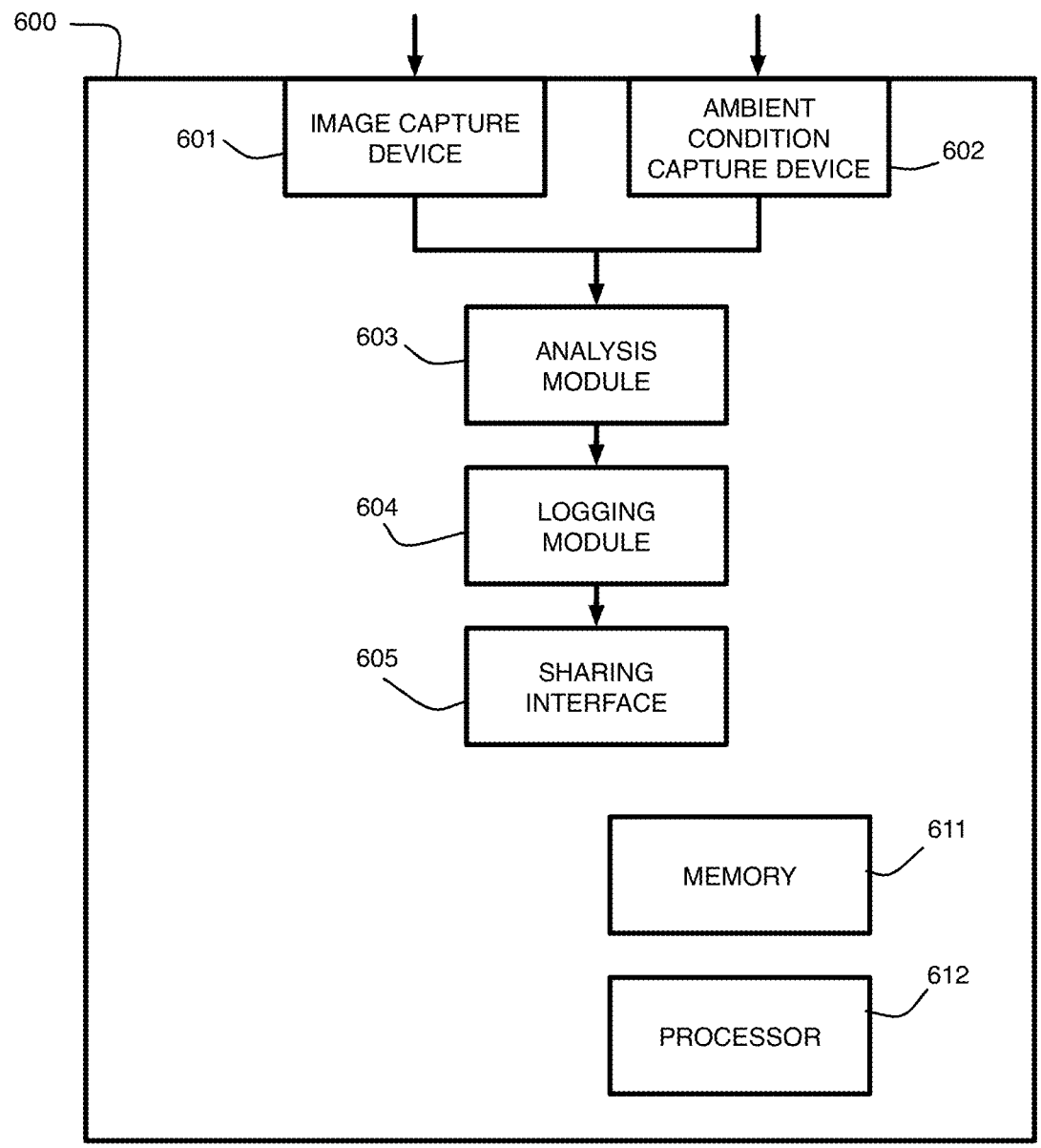
FIG. 6 is a diagram of a computer system for re-creating sensory and cognitive milieu associated with an environment in which a photograph is captured according to an embodiment of the present invention.

Furthermore, it should be noted that any of the methods described herein can include an additional step of providing a system (e.g., 600, FIG. 6) including an image capture device 601 (e.g., camera), an ambient condition capture device 602 (e.g., wearable activity tracker, GPS chip, microphone, etc.), an analysis module 603 for associating the captured ambient condition to the photograph, a logging module 604 for logging the photograph and metadata including data about the ambient condition output by the analysis module 603, and a sharing interface 605 for sharing the photograph and metadata (e.g., outputting the data using a display and speaker or communicating the image and the metadata to a remote server via the Internet).

According to an embodiment of the present invention, the analysis module 603 resolves an audio track corresponding to the captured ambient condition. In one example, the analysis module 603 compares the captured ambient condition to local media to determine a matching audio track. In another example, the analysis module 603 communicates the captured ambient condition to a service, which returns data including or identifying a substitute audio track. In this way, the analysis module 603 encodes data in the metadata that identifies the substitute audio track, which can be output together with the image. In view of the foregoing, the term "resolve" includes returning data including a substitute audio track, returning data (from local media, a cloud infrastructure, remote server, etc.) identifying a substitute audio track, etc.

According to an embodiment of the present invention, the analysis module 603 is a scene analyzer module configured to detect an ambient lighting condition substantially contemporaneous (e.g., within about 0-5 seconds, and preferably within 0-1 second) with the capture of the image.

According to an embodiment of the present invention, the ambient condition capture device 602 is embodied as one or more of a microphone, a light sensor, and an accelerometer. In the case of the microphone, the ambient condition capture device 602 captures ambient sounds as an audio sample digital waveform. In the case of the light sensor, ambient conditions such as light intensity, or luminance, as well as quality (e.g., hard or soft lighting), color cast, etc. can be determined. In the case of the accelerometer, the ambient condition capture device can detect tremors, such as might be perceived at an motorsport event, motion by the system, for example, in the case of action photographs (e.g., skydiving), etc., or detect movement between a sequence of photographs. This movement data can be used to, for example, trigger a blending edges of a first image to suggest to a viewer that a second image can be viewed by moving an image display device.

In yet another embodiment, the ambient condition capture device 602 includes an analog-to-digital (A-D) conversion part receiving a music signal, a memory write part writing A-D converted music data in an integrated memory device such as memory 611, and a player part (e.g., the sharing interface 605) for playing the music recorded in the memory device 611. The system further includes processor 612, which analyzes the music signal.

Further, the system includes a computer program product embodied in a tangible computer-readable recordable storage medium 611 with code adapted to be executed by a processor 612 to carry out one or more method steps described herein, including the provision of the system with the distinct software modules.

Figure 7:
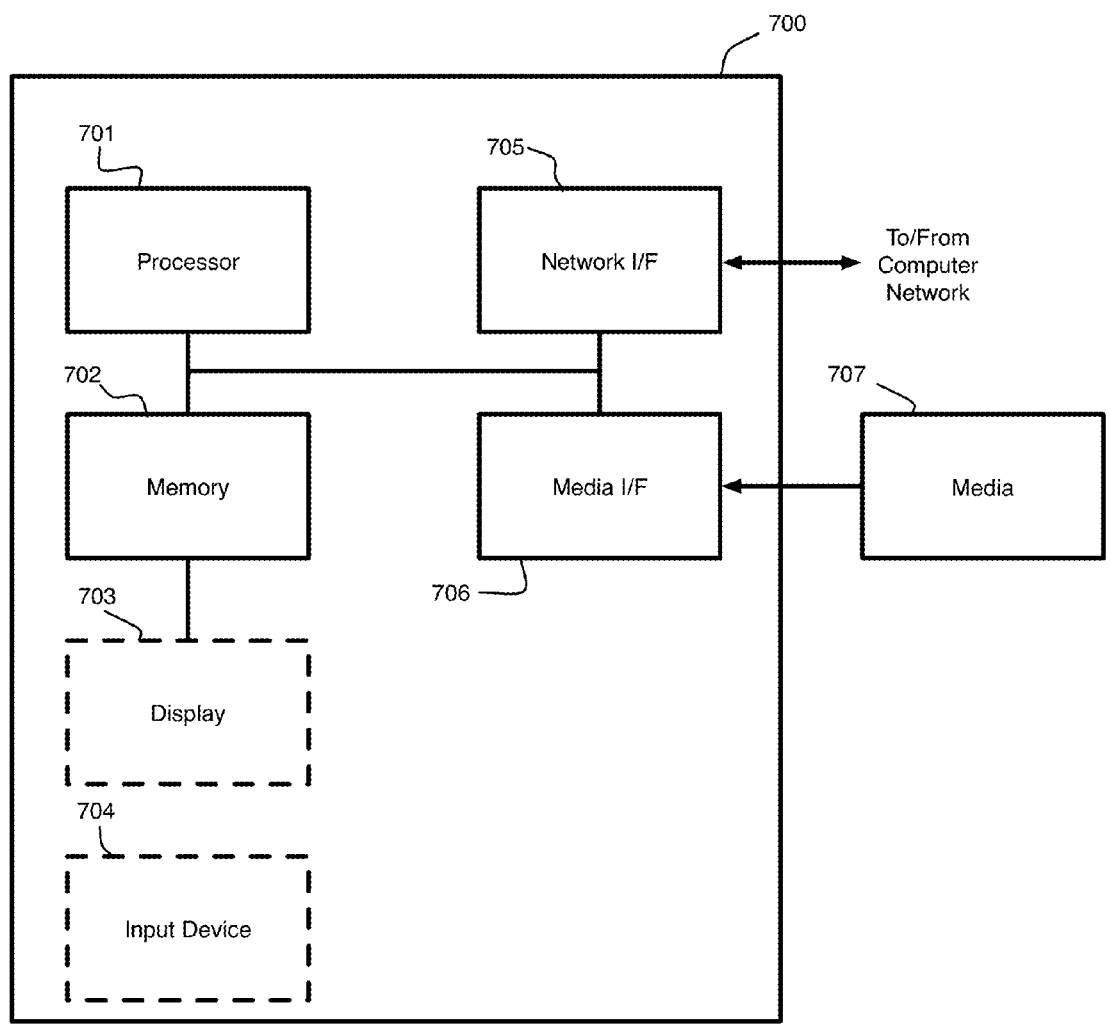
FIG. 7 is a diagram of a computer system configured to implement a cognitively biased control according to an exemplary embodiment of the present invention.

Referring to FIG. 7; FIG. 7 is a block diagram depicting an exemplary computer system configured for re-creating sensory and cognitive milieu associated with an environment in which a photograph is captured according to an embodiment of the present invention. The computer system shown in FIG. 7 includes a processor 701, memory 702, display 703, input device 704 (e.g., keyboard), a network interface (I/F) 705, a media I/F 706, and media 707, such as a signal source, e.g., camera, Hard Drive (HD), external memory device, etc.

In at least one embodiment of the present invention, the metadata associated with an image is processed to recreate the ambient lighting conditions, sounds and motion existing when the image was captured. For example, a detected tremor can be recreated by sound system using deep bass. In another example, ambient lighting conditions can be recreated using controllable LED lighting, which are synced to the metadata of a currently displayed image.

In different applications, some of the components shown in FIG. 7 can be omitted. The whole system shown in FIG. 7 is controlled by computer readable instructions, which are generally stored in the media 707. The software can be downloaded from a network (not shown in the figures), stored in the media 707. Alternatively, software downloaded from a network can be loaded into the memory 702 and executed by the processor 701 so as to complete the function determined by the software.

The processor 701 may be configured to perform one or more methodologies described in the present disclosure, illustrative embodiments of which are shown in the above figures and described herein. Embodiments of the present invention can be implemented as a routine that is stored in memory 702 and executed by the processor 701 to process the signal from the media 707. As such, the computer system is a general-purpose computer system that becomes a specific purpose computer system when executing routines of the present disclosure.

Although the computer system described in FIG. 7 can support methods according to the present disclosure, this system is only one example of a computer system. Those skilled of the art should understand that other computer system designs can be used to implement embodiments of the present invention.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A system comprising:
an image capture device configured to capture an image;
an ambient condition capture device configured to capture ambient milieu data substantially contemporaneous with the capture of the image, said ambient condition capture device comprising:
- an accelerometer configured to detect movement of the system substantially contemporaneous with the capture of the image and to add data about the movement to the ambient milieu data, wherein the data about the movement is configured to be recreated as an audio output; and
- a microphone configured to capture an audio track substantially contemporaneous with the capture of the image;

an analysis module configured to resolve the audio track by adding data identifying a substitute audio track in the ambient milieu data; and a memory storing a package comprising the image and the ambient milieu data.

2. The system of claim 1, further comprising a scene analyzer module configured to detect an ambient lighting condition substantially contemporaneous with the capture of the image.

3. The system of claim 1, wherein the ambient condition analyzer is a communications device configured to send the ambient milieu data to a server configured to return the substitute audio track to the image capture system.

4. The system of claim 1, wherein the analysis module is configured to resolve the data about the movement as an edit of the image data.

5. The system of claim 1, wherein the analysis module is configured to resolve the data about the movement as an association with another image.

* * * * *